Jan. 23, 1951 A. H. DALL 2,538,746
BEARING CONSTRUCTION
Filed April 6, 1945 3 Sheets-Sheet 1

INVENTOR.
Albert H. Dall
BY
Blair, Curtis + Hayward
ATTORNEYS

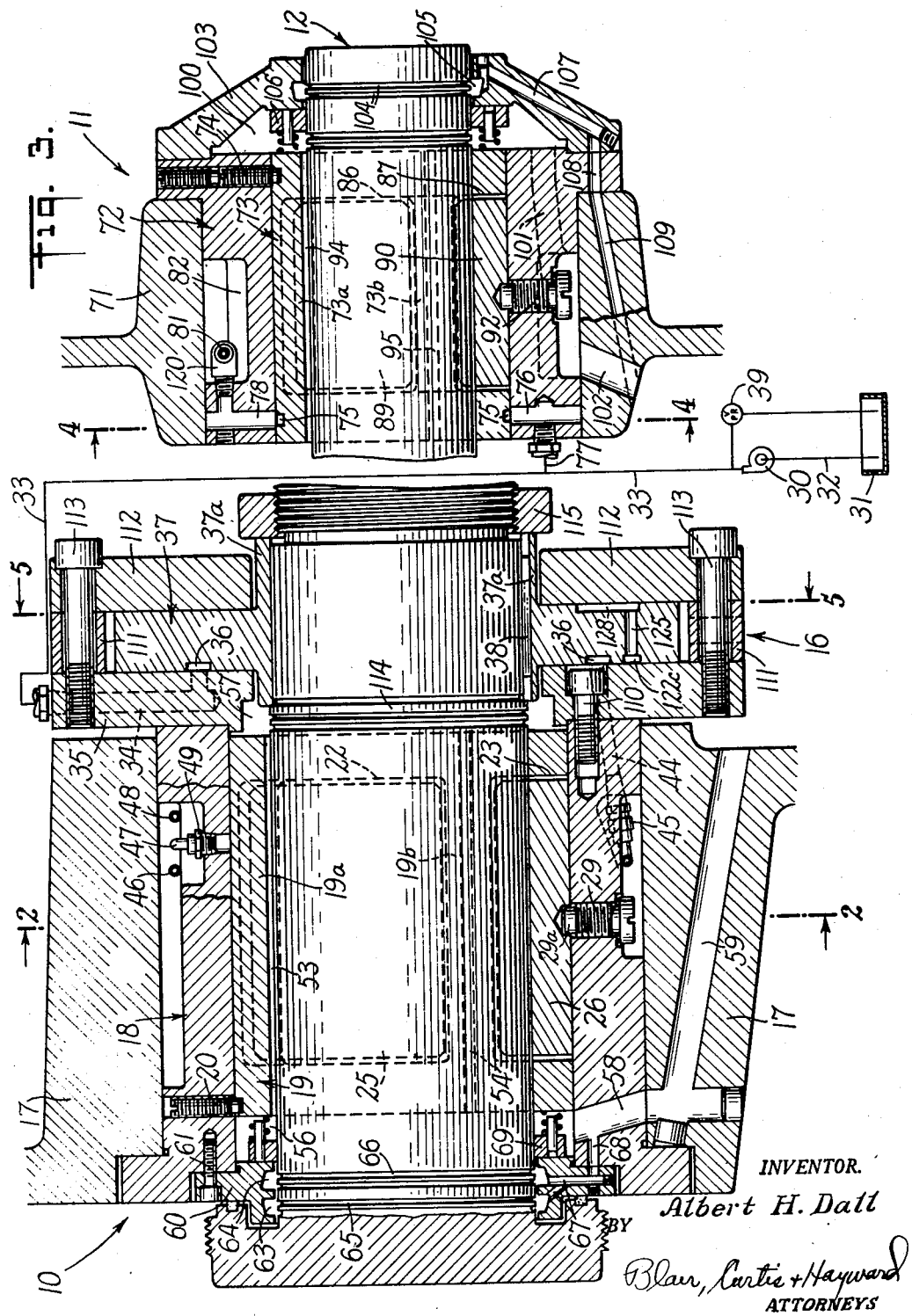

Jan. 23, 1951  A. H. DALL  2,538,746
BEARING CONSTRUCTION
Filed April 6, 1945  3 Sheets-Sheet 3

INVENTOR.
Albert H. Dall
BY
Blair, Curtis + Hayward
ATTORNEYS

Patented Jan. 23, 1951

2,538,746

UNITED STATES PATENT OFFICE 2,538,746

BEARING CONSTRUCTION

Albert H. Dall, Cincinnati, Ohio, assignor to The Cincinnati Milling Machine Co., Cincinnati, Ohio, a corporation of Ohio Application April 6, 1945, Serial No. 586,896

8 Claims. (Cl. 308—73)

This invention relates to bearing construction.

One of the objects of this invention is to provide a bearing construction for a shaft or spindle which is simple, practical, and thoroughly durable. Another object is to provide a construction of the above character in which friction is reduced to a minimum. Another object is to provide a construction of the above character which is efficient in operation regardless of whether the shaft or spindle rotates at a high or low speed and regardless of the unit load the shaft or spindle is carrying. Another object is to provide a construction of the above character which maintains the axis of the shaft or spindle substantially centered at all times with respect to the bearing supporting surfaces. Another object is to provide a new and improved thrust bearing which is efficient in operation and effectively prevents longitudinal movement of the member on which the thrust bearing is mounted. Still another object is to provide a thrust bearing which operates with a minimum of friction. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

In the accompanying drawings, in which is shown one of the various possible embodiments of this invention, Figure 1 is a side elevation partly in section of a spindle mounted on a pair of bearings of the type to be disclosed herein;

Figure 3 is a vertical section taken through the spindle and bearing shown in Figure 1 and is taken on the line 3—3 of Figure 2;

Similar reference characters refer to similar parts throughout the several views of the drawings.

Figure 2:
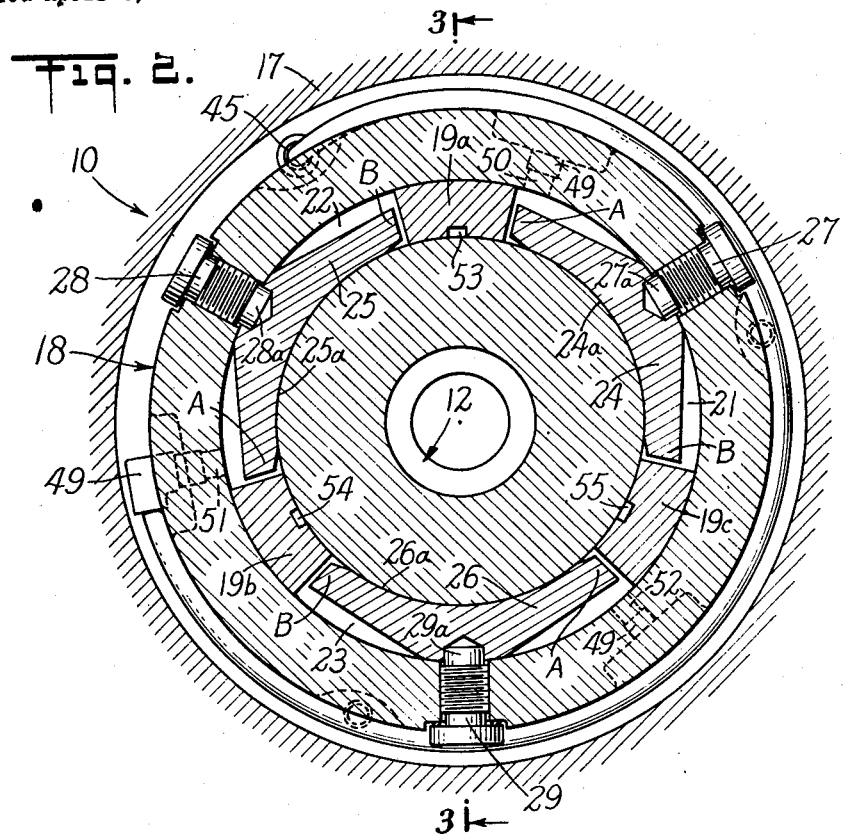
Figure 2 is a vertical section taken on the line 2—2 of Figure 3.
Figure 1:
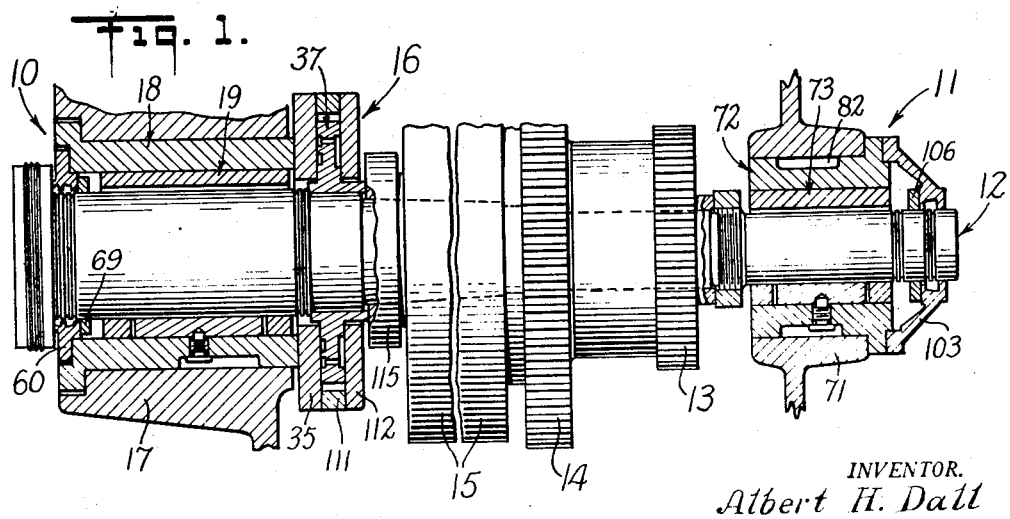

As conducive to a clearer understanding of certain features of this invention, it might here be pointed out that hydrodynamic or multiple shoe bearings have certain disadvantages. One of these disadvantages lies in the fact that no hydrodynamic films are present under the bearing shoes at zero speed, and accordingly the bearing surfaces are in metal to metal contact. Thus the starting torque is that required for metal to metal sliding and it is another object of this invention to overcome this high starting torque. Another disadvantage is that the pressure films between the shoes of a multiple shoe bearing and adjacent bearing surface are thin on the dead load side and thick on the opposite side. If an impact load, such as encountered in milling, is placed on the spindle in the direction of the thick pressure films, this results in a greater displacement of the spindle than if the load is in the opposite direction, i. e. with the dead load because the rigidity of a fluid film varies inversely as to its thickness to some power much greater than one. There is a further disadvantage of a hydrodynamic bearing; if it is adjusted for high speed under high unit loads, the clearance between the shoes and the adjacent bearing surface is too great to build up efficient hydrodynamic pressure films at low speeds and if the bearing shoes are adjusted for low speed, the clearance is too small for efficient operation at high speed. Another object is to overcome the above difficulties, as well as many others.

Referring now to the drawings, the opposite ends of a spindle, generally indicated at 12, are mounted on a pair of bearings 10 and 11. Spindle 12 is driven through either gear 13 or gear 14 which are keyed to the spindle shaft. These gears are operatively connected to and drive a coupling 15 which is also mounted upon spindle 12. A thrust bearing, generally indicated at 16, is provided for resisting axial movement of spindle 12 longitudinally with respect to bearings 10 and 11.

Bearing 10 includes a housing 17 (Figure 3) within which a bushing, generally indicated at 18, is mounted. Bushing 18 is connected to housing 10 in any suitable manner such as by screws (not shown). Within bushing 18 a second bushing, generally indicated at 19, is mounted. This bushing is connected to bushing 18 by a series of screws similar to screw 20. Bushing 19 has three pockets 21, 22, and 23 (Figure 2) therein circumferentially disposed about spindle 12. These pockets which are cut completely through the bushing are of the same size and separated from each other by portions 19a, 19b, and 19c of bushing 19. The bearing surface of bushing 19 including portions 19a, 19b, and 19c is spaced from the spindle to provide a slight clearance therebetween; for example, this clearance may be on the order of .002 of an inch. Tilting shoes 24, 25, and 26 are mounted in pockets 21, 22, and 23, respectively. These tilting shoes are identical in construction and have arcuate faces 24a, 25a, and 26a of a radius slightly greater than the radius of the spindle journal around which they are mounted. The shoes as a whole are of a length and width slightly smaller than the length and width of the pockets (Figure 3) in which they are mounted. The backs of the shoes are shaped so that their ends are spaced from bushing 18 and the shoes increase in width to the center portion at which point they are mounted upon bushing 18 by screws 27, 28, and 29 which are threaded into bores extending through bushing 18. The inner ends 27a, 28a, and 29a of the screws are not threaded and extend into similarly shaped but slightly larger bores in shoes 24, 25, and 26. The central rear portions of the shoes abutting against bushing 18 are curved with a radius of curvature slightly smaller than that of the bore of bushing 18. This permits each of the shoes to rock on the ends 27a, 28a, and 29a transversely with respect to the bearing surface of spindle 12 or toward and away from its axis. The outer ends of each of the shoes slant away from the spindle surface to aid the entrance of fluid beneath the shoe when the spindle 12 is turning.

Figure 5:
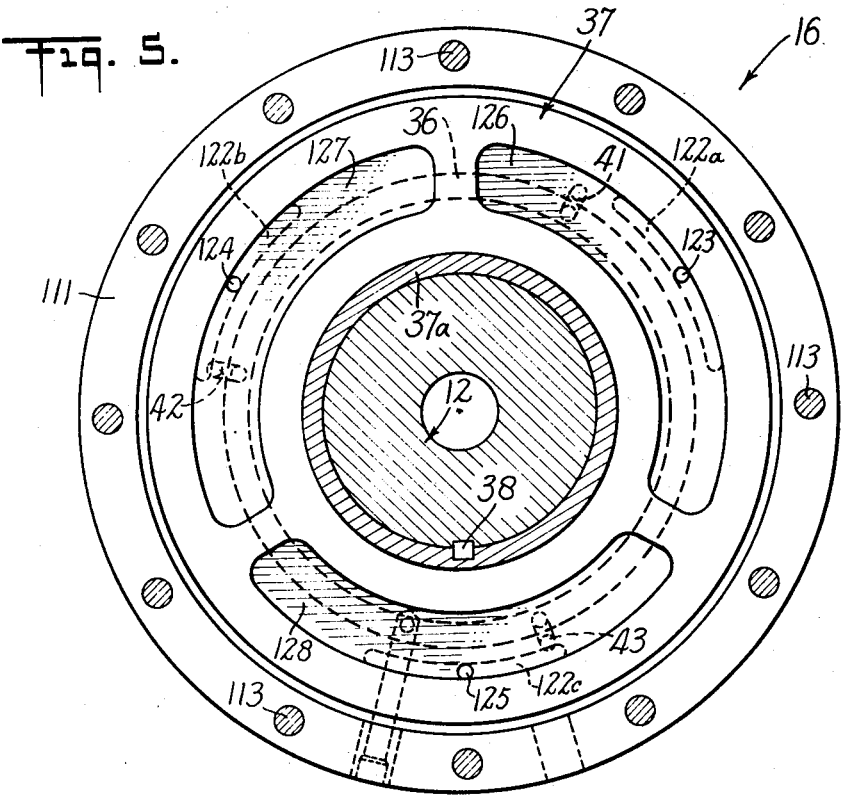
Figure 5 is a vertical section taken on the line 5—5 of Figure 3.

A pump driven by a source of power operating whether shaft 12 is stationary or rotating, diagrammatically indicated at 30 (Figure 3), pumps fluid from a sump, diagrammatically indicated at 31, through conduits 32 and 33 to bore 34. Pressure in conduit 33 is maintained constant by a relief valve, diagrammatically indicated at 39. Bore 34 extends downwardly in one of the sideplates 35 of the housing of thrust bearing 16 and then extends inwardly to an annular pressure groove 36 (Figures 3 and 5) formed in the side wall of the thrust disc, generally indicated at 37 (Figures 3 and 5.) Thrust disc 37 has a hub 37a which is keyed by key 38 to spindle 12 and thus disc 37 rotates with spindle 12.

Bores 41, 42, and 43 extend through plate 35 at circumferentially spaced points and connect with groove 36. Bores 41 and 42 are aligned with bores extending through bushing 18 similar to bore 44 (Figure 3) with which bore 43 is aligned. The three bores in bushing 18 are connected by couplings similar to coupling 45 (Figure 3) to three resistance tubes 46, 47, and 48 extending about the bushing 18. Each of these tubes is connected by couplings, similar to coupling 49, to one of holes 50, 51, and 52 (Figure 2) which extend through bushing 18 and open into pockets 21, 22, and 23. Thus pockets 21, 22, and 23 (Figure 2) are supplied with fluid under pressure from groove 36 (Figure 3) through separate connections to groove 36 which include resistance tubes 46, 47, and 48.

As pointed out hereinabove, pockets 21, 22, and 23 are separated by dam portions 19a, 19b, and 19c of bushing 19. Each of these dam portions has a collector groove 53, 54, and 55 (Figure 2) which extend longitudinally (Figure 3) throughout the length of the bushing 19. These grooves are connected to the annular spaces 56 and 57 at the left and right-hand ends of bushing 19, as viewed in Figure 3. Space 56 is connected to the sump through bores 58 and 59 while space 57 is connected to the sump through portings (not shown). Grooves 53, 54, and 55 being thus connected to the sump are accordingly at low pressure. An annular ring 60 is connected to bushing 18 by a series of screws similar to screw 61 and is provided with a pair of internal annular grooves 63 and 64 which are positioned adjacent collecting grooves 65 and 66 in spindle 12. These grooves are connected by bores 67 and 68 to bore 58 and a sealing ring 69 is spring pressed against the ring 60. Thus any fluid which leaks past the sealing ring 69 is collected in grooves 63 and 64 and is then directed to the sump.

In operation, the shoes 24, 25, and 26 tilt in such manner as to establish a hydrodynamic film between their bearing surfaces and the spindle 12. More particularly, assuming a rotation of the spindle in a counterclockwise direction, as viewed in Figure 2, fluid in the pockets is urged between the shoes by the spindle, entering adjacent the ends B and advancing toward the ends A of each shoe; the shoes rock about the ends of screws 27, 28 and 29, the ends A thereof moving closer to the spindle and the ends B moving further away. Continuation of rotation in this direction creates a hydrodynamic pressure film between each shoe and the spindle which is of greatest intensity in the vicinity of the ends A. This prevents metal to metal contact so long as the spindle rotates and in spite of large impact loads applied to the spindle.

Additionally, fluid under pressure in pockets 21, 22, and 23 and on the adjacent surfaces of the dam portions 19a, 19b, and 19c hold the spindle free from metal to metal contact whether or not the spinde is rotating. This materially reduces starting torque and is particularly advantageous where the bearing is used on a milling machine where the machine starts and stops for each work piece. The pressure in these pockets also supplements the action of the shoes by resisting axial displacement of the spindle and further reducing friction; it also adds rigidity to the structure. When the spindle moves in response to an external load, the clearance between the spindle and the portion of bushing 19 facing the direction of such movement is decreased. Thus flow resistance from whichever of pockets 21, 22, and 23 is facing the direction of such movement is increased to increase the pressure in these pockets. There will be the opposite action on the side from which the force is applied, i. e., increased clearance, a decrease in flow resistance, and a consequent decrease in pocket pressure. Thus the pressure in the pockets is always automatically adjusted to meet a load, regardless of the direction of its application. The net effect of such action is that the fluid in the pockets is constantly resisting any off center operation of the spindle. The resistance tubes 46, 47, and 48 tend to maintain changes in pocket pressures as described.

Figure 4:
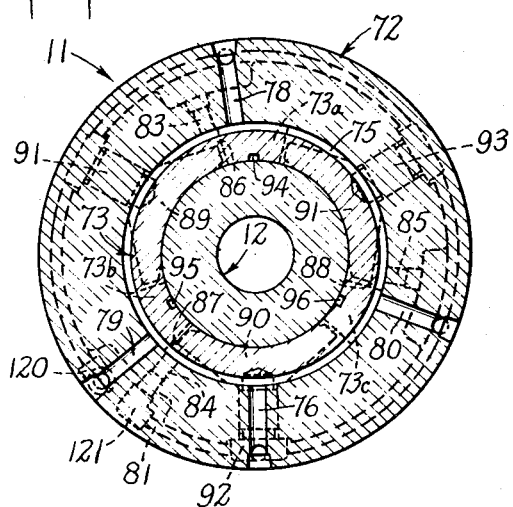
Figure 4 is a vertical section taken on the line 4—4 of Figure 3.

Bearing 11 (Figure 3) is basically similar in construction to bearing 10. This bearing includes a bearing housing 71 having a bushing 72 mounted therein. Bushing 72 is connected to bearing housing 71 in any suitable manner, such as by screws. A second bushing, generally indicated at 73, is mounted within bushing 72 and is connected thereto by a series of screws similar to screw 74. Bushing 73 has an annular groove 75 therein which is aligned with a bore 76 in bushing 72. Bore 76 is connected by conduit 77 to the fluid pressure conduit 33. Bushing 72 has three bores 78, 79, and 80 (Figures 3 and 4) which extend therethrough and which are aligned with the fluid pressure groove 75 in bushing 73. Bores 78, 79, and 80 are connected to resistance tubes similar to resistance tube 81 by couplings similar to coupling 120 (Figure 3). These resistance tubes extend around the bushing 72 in an annular groove 82 (Figure 3) and each one is connected by a coupling similar to coupling 121 to bores 83, 84, and 85. Bores 83, 84, and 85 open into pockets 86, 87, and 88 in bushing 73. These pockets contain tilting shoes 89, 90, and 91 which are substantially similar in construction to the tilting shoes in bearing 12 and are mounted on the inner ends of adjustable screws 91, 92, and 93 to rock transversely or toward and from the axis of the spindle.

As in bearing 12, pockets 86, 87, and 88 are separated by dam portions 73a, 73b, and 73c of bushing 73. Each of these dam portions is provided with a collector groove 94, 95, and 96 extending longitudinally of bushing 73. These grooves are open to the sump at their left-hand ends, as viewed in Figure 3, and at their right-hand ends open into an annular shaped space 100, which is connected by bores 101 and 102 to the sump. This bearing is provided with a capping plate 103 which is connected to bushing 72 in any suitable manner, such as by screws. This plate has an annular groove 105 therein which is aligned with grooves 104 extending around spindle 12 and serves to collect any fluid which passes the sealing ring 106 spring pressed against plate 103. Groove 105 is connected to the sump through bores 107, 108, and 109. The shoes in this bearing act in a manner similar to the shoes in bearing 10 and as the pockets 86, 87, and 88 are supplied with fluid under pressure through resistance tubes, these pockets also act to center the spindle with respect to the bearing.

The operation of bearings 10 and 11 is substantially similar and if a fluid having a low viscosity is supplied under pressure to the pockets holding the tilting shoes, static friction between the spindle and bearings is substantially reduced. Also friction resulting from loads applied to the spindle during operation is diminished by the counteracting pressures in the pockets. Furthermore, under impact loads which are in the direction of the dead load, such as are encountered in milling, the hydrodynamic pressure films on the bearing shoes prevent metallic contact between the shoes and the spindle. When the impact load is in the opposite direction or toward the side having the thicker hydrodynamic pressure film, displacement of the spindle is minimized; the hydrodynamic pressure film and the pressure in the pockets coact to hold the spindle and thus absorb the impact load with maximum rigidity.

A further advantage of the bearing described lies in the fact that the multiple shoe bearings may be adjusted to sufficient clearance for high speed operation and yet at low speed the pressure films on the bearing shoes support an impact load in the direction of the dead load and the fluid in the pressure pocket on the opposite side of the spindle supports impact loads in the opposite direction. When the spindle is run at a high speed, the hydrodynamic bearing shoes support loads regardless of the direction in which they are applied, for at this time pressure films exist between all sides of the spindle and the shoes.

Referring now to thrust bearing 16, its housing plate 35 is connected to bushing 18 by a series of screws 110 (Figure 3). An annular ring 111 is positioned between sideplate 35 and a sideplate 112 of the thrust bearing housing. Plates 35 and 112 and ring 111 are held in assembled relationship by a series of screws 113. The width of ring 111 is slightly greater than the thickness of thrust disc 37 and thus maintains inner walls of plates 35 and 112 spaced slightly from disc 37.

Disc 37 has a hub portion 37a and is held in a set position on spindle 12 between collar 114 formed thereon and a nut 115 bearing against hub 37a. Thus any longitudinal movement of spindle 12 is transmitted to thrust disc 37. Adjacent pressure groove 36 (Figures 3 and 5) and cut into disc 37 are a series of circumferentially spaced pockets 122a, 122b, and 122c. These pockets are connected by bores 123, 124, and 125 (Figure 5) extending transversely through disc 37 to three pressure pockets 126, 127, and 128 cut into the opposite side of disc 37. These pockets are substantially greater in size than pockets 122a, 122b, and 122c and when fluid under pressure is introduced in groove 36, right-hand axial movement of the spindle, as viewed in Figure 3, is counteracted.

More particularly, such right-hand movement of the spindle increases the clearance between plate 35 and disc 37 to decrease flow resistance between groove 36 and the pockets 122a, 122b, and 122c. Due to bores 123, 124, and 125, the pressure in pockets 126, 127, and 128 increases; this action is further supplemented by a decrease in the clearance between disc 37 and plate 112 to further increase pocket pressures by increasing flow resistance therefrom. Such increase in pressure will be proportioned to the force acting to urge the spindle toward the right and consequently there is an instantaneous reaction set up to counteract any such movement.

By using bearings similar to bearings 11 and 10, efficient bearing action is attained at low speeds and the high starting torque of the usual hydrodynamic type of bearing is eliminated. When the bearing has reached operating speed, the pressure in the tilting shoe pockets can be reduced to that necessary to supply fluid to the shoes, thus greatly reducing the use of the lubricating fluid. By using a low viscosity fluid, fluid friction at high speed is kept at a minimum.

Thus it will be seen that a thoroughly practical and durable bearing construction has been disclosed. Furthermore, a bearing construction has been disclosed which operates efficiently at low or high rates of speed under a high unit load with a minimum of bearing friction. Accordingly, it will be seen that the objects mentioned hereinabove as well as many others are successfully accomplished.

As many possible embodiments may be made of the mechanical features of the above invention, and as many changes might be made in the embodiment above set forth, all without departing from the scope of the invention, it is to be understood that all matter hereinbefore set forth, or shown in the accompanying drawings, is to be interpreted illustratively and not in a limiting sense.

I claim:

1. In bearing construction, in combination, a bearing member, a journal member rotatably mounted within said bearing member, there being clearance space between the bearing surfaces of said members to allow for relative lateral movement between said members, the bearing surface of one of said members having a plurality of pockets therein, said pockets being circumferentially spaced from each other around the bearing surface of said last-mentioned member, said pocket being spaced from the edges of said last-mentioned bearing surface, a closed separate channel for each pocket solely connected to said pocket and to a source of fluid under pressure, a flow restriction positioned in each of said channels forming a resistance to flow of fluid into each pocket, said clearance space forming a resistance to the flow of fluid from said pockets to create a film of fluid around the circumference of said journal member under sufficient pressure to maintain said journal member out of contact with said bearing member under static conditions, and a plurality of bearing shoes rockably mounted on said bearing member at points spaced around the circumference of said journal member, said bearing shoes being mounted adjacent said journal member to generate a hydro-dynamic film between the shoes and the journal member upon rotation of the journal member whereby the action of said hydro-dynamic film supplements the action of said film of fluid under dynamic conditions.

2. In bearing construction, in combination, a bearing member, a journal member rotatably mounted within said bearing member, there being clearance space between the bearing surfaces of said members to allow for relative lateral movement between said members, the bearing surface of said bearing member having a plurality of pockets therein, said pockets being circumferentially spaced from each other around the bearing surface of said last-mentioned member, said pockets being spaced from the edges of the bearing surface of said bearing member, a closed separate channel for each pocket solely connected to said pocket and to a source of fluid under pressure, a flow restriction positioned in each of said channels forming a resistance to flow of fluid into each pocket, said clearance space forming a resistance to the flow of fluid from said pockets to create a film of fluid around the circumference of said journal member under sufficient pressure to maintain said journal member out of contact with said bearing member under static conditions, and a plurality of bearing shoes rockably mounted on said bearing member at points spaced around the circumference of said journal member, said bearing shoes being mounted adjacent said journal member to generate a hydro-dynamic film between the shoes and the journal member upon rotation of the journal member whereby the action of said hydro-dynamic film supplements the action of said film of fluid under dynamic conditions.

3. In bearing construction, in combination, a bearing member, a journal member rotatably mounted within said bearing member, there being clearance space between the bearing surfaces of said members to allow for relative lateral movement between said members, the bearing surfaces of said bearing member having a plurality of pockets therein, said pockets being circumferentially spaced from each other around the bearing surface of said last-mentioned member, said pockets being spaced from the edges of the bearing surface of said bearing member, a closed separate channel for each pocket solely connected to said pocket and to a source of fluid under pressure, a flow restriction positioned in each of said channels forming a resistance to flow of fluid into each pocket, the clearance space between the bearing surfaces forming a resistance to the flow of fluid from said pockets to create a film of fluid under pressure around the circumference of said journal member under sufficient pressure to maintain said journal member out of contact with said bearing member under static conditions, and a plurality of bearing shoes rockably mounted in said pockets on said bearing member, said bearing shoes being mounted adjacent said journal member to generate a hydro-dynamic film between the shoes and the journal member upon rotation of the journal member whereby the action of said hydro-dynamic film supplements the action of said film of fluid under dynamic conditions.

4. In bearing construction, in combination, a bearing member, a journal member rotatably mounted within said bearing member, there being clearance space between the bearing surfaces of said members to allow for relative lateral movement between said members, the bearing surface of one of said members having a plurality of pockets therein, said pockets being circumferentially spaced from each other around the bearing surface of said last-mentioned member, said pockets being spaced from the edges of the bearing surface of said last-mentioned member, a closed separate channel for each pocket solely connected to said pocket and to a source of fluid under pressure, a flow restriction positioned in each of said channels forming a resistance to flow of fluid into each pocket, said clearance space forming a resistance to the flow of fluid from said pockets to create a film of fluid around the circumference of said journal member under sufficient pressure to maintain said journal member out of contact with said bearing member under static conditions, a series of bearing shoes, and means mounting each shoe for rocking movement in a plane transverse to the axis of said journal member, said shoes rocking about fixed lines parallel to the axis of said journal member so that rotation of the journal member generates a hydro-dynamic film between said shoes and said journal member whereby the action of said hydro-dynamic film supplements the action of said film of fluid under dynamic conditions.

5. In bearing construction, in combination, a bearing member, a journal member rotatably mounted within said bearing member, there being clearance space between the bearing surfaces of said members to allow for relative lateral movement between said members, the bearing surface of said bearing member having a plurality of pockets therein, said pockets being spaced from the edges of the bearing surface of the bearing members and being in substantial circumferential alignment around the bearing surface of said last-mentioned member, the clearance space between said bearing surfaces forming the principal path for escape of fluid from each pocket, a closed separate channel for each pocket solely connected to said pocket and to a source of fluid under pressure, a flow restriction positioned in each of said channels forming a resistance to flow of fluid into each pocket, said clearance space forming a resistance to the flow of fluid from said pockets to create a film of fluid around the circumference of said journal member under sufficient pressure to maintain said journal member out of contact with said bearing member under static conditions, and a plurality of bearing shoes rockably mounted in said pockets, said bearing shoes rocking on axes spaced from the bearing surface of said journal member, said axes being parallel to the axis of said journal member so that rotation of the journal member generates a hydro-dynamic film between said shoes and said journal member whereby the action of said hydro-dynamic film supplements the action of said film of liquid under dynamic conditions.

6. In bearing construction, in combination, a bearing member, a journal member rotatably mounted within said bearing member, there being clearance space between the bearing surfaces of said members to allow for relative lateral movement between said members, the bearing surface of one of said members having a plurality of pockets therein, said pockets being circumferentially spaced from each other around the bearing surface of said last-mentioned member, said pockets being spaced from the edges of the bearing surface of said last-mentioned member, a closed separate channel for each pocket solely connected to said pocket and to the pressure side of a pump, a hydraulic resistance positioned in each of said channels forming a resistance to flow of liquid into each pocket, the clearance space between said bearing surfaces forming a resistance to flow of liquid out of each pocket, said pump continuously supplying liquid to each pocket through said channels under pressure to create and maintain a journal supporting film of liquid in said clearance space under pressure to separate said bearing surfaces under static conditions, and a plurality of bearing shoes, means rockably mounting said bearing shoes on said bearing member at points spaced from and around the bearing surface of said journal member, said bearing shoes being mounted to rock on axes parallel to the axis of said journal member so that rotation of the journal member generates a hydrodynamic film of liquid between the shoes and the journal member whereby the action of said hydro-dynamic film supplements the action of said liquid film under dynamic conditions.

7. In bearing construction, in combination, a bearing member, a journal member rotatably mounted within said bearing member, there being clearance space between the bearing surfaces of said member to allow for relative lateral movement between said members, the bearing surface of said bearing member having a plurality of pockets therein spaced from the edges of the bearing surface of said bearing member, said pockets being equidistantly spaced from each other and in substantial circumferential alignment around the bearing surface of said last-mentioned member, a closed separate channel for each pocket solely connected to said pocket and to the pressure side of a pump, a hydraulic resistance positioned in each of said channels forming a resistance to flow of liquid into each pocket, said pump continuously supplying liquid to said pockets under pressure, the pressure of the liquid in said pockets maintaining the journal member out of contact with said bearing member under static conditions, said clearance space forming a resistance to the flow of fluid from said pockets to create a film of fluid around the circumference of said journal member under sufficient pressure to maintain said journal member out of contact with said bearing member under static conditions, and a bearing shoe rockably mounted in each pocket so that rotation of the journal member generates a hydro-dynamic film between the shoes and the bearing surface of the journal member whereby the action of said hydrodynamic film supplements the action of said liquid film under dynamic conditions.

8. In bearing construction, in combination, a bearing member, a journal member rotatably mounted on said bearing member, there being clearance space of oil film dimensions between the bearing surfaces of said members to allow for relative lateral movement between said members, the bearing surface of said bearing member having a plurality of pockets therein spaced from the edges of the bearing surface of said bearing member, said pockets being equidistantly spaced from each other and in substantial circumferential alignment around the bearing surface of said last-mentioned member, a closed separate channel for each pocket solely connected to said pocket and to a source of lubricant under pressure, a hydraulic resistance positioned in each of said channels forming a resistance to flow of lubricant into each pocket, said source of lubricant continuously supplying lubricant under pressure to each pocket, the clearance space between said bearing surfaces forming the sole means of escape of lubricant from each pocket, said clearance space forming a resistance to the flow of fluid from said pockets to create a film of fluid around the circumference of said journal member under sufficient pressure to maintain said journal member out of contact with said bearing member under static conditions, a plurality of bearing shoes, and means mounting a shoe in each pocket for rocking movement in a plane transverse to the axis of said journal member so that said bearing shoes rock about fixed lines parallel to said journal member, the bearing surfaces of said shoes facing and being complementary to the bearing surface of said journal member so that rotation of said journal member generates a hydro-dynamic film between said shoes and said journal member whereby the action of said hydro-dynamic film supplements the action of said oil film under dynamic conditions.

ALBERT H. DALL.

REFERENCES CITED

The following references are of record in the file of this patent:

UNITED STATES PATENTS

| Number | Name | Date |
| --- | --- | --- |
| 1,086,308 | Parsons | Feb. 3, 1914 |
| 1,906,715 | Penick | May 2, 1933 |
| 2,003,316 | Shein | June 4, 1935 |
| 2,160,778 | Dall | May 30, 1939 |
| 2,348,928 | Sampatacos | May 16, 1944 |